United States Patent
Vijaya Kumar et al.

(10) Patent No.: US 10,501,146 B2
(45) Date of Patent: Dec. 10, 2019

(54) ADAPTIVE PEDAL ASSIST SYSTEMS AND CONTROL LOGIC FOR INTELLIGENT E-BIKES

(71) Applicant: GM Global Technology Operations LLC, Detroit, MI (US)

(72) Inventors: Vivek Vijaya Kumar, Shelby Township, MI (US); Donald K. Grimm, Utica, MI (US)

(73) Assignee: GM Global Technology Operations LLC, Detroit, MI (US)

(*) Notice: Subject to any disclaimer, the term of this patent is extended or adjusted under 35 U.S.C. 154(b) by 74 days.

(21) Appl. No.: 15/955,177

(22) Filed: Apr. 17, 2018

(65) Prior Publication Data

US 2019/0315431 A1    Oct. 17, 2019

(51) Int. Cl.
| | | |
|---|---|---|
| *A63B 69/00* | (2006.01) | |
| *B62M 6/45* | (2010.01) | |
| *B62M 6/90* | (2010.01) | |
| *B62M 6/55* | (2010.01) | |
| *A61G 5/10* | (2006.01) | |
| *A61G 5/04* | (2013.01) | |

(52) U.S. Cl.
CPC .............. *B62M 6/45* (2013.01); *A61G 5/048* (2016.11); *A61G 5/1037* (2013.01); *B62M 6/55* (2013.01); *B62M 6/90* (2013.01); *Y02T 10/646* (2013.01)

(58) Field of Classification Search
CPC .. G01L 3/10; B62M 6/40; B62M 6/45; B62M 6/50; B62M 6/55; B62M 6/90; B62J 2099/0026; B62K 2207/04; Y02T 10/7258; Y02T 10/646; A61G 5/1037

USPC ................................ 701/22; 482/4, 5, 8, 9
See application file for complete search history.

(56) References Cited

U.S. PATENT DOCUMENTS

| | | | |
|---|---|---|---|
| 5,878,831 A | 3/1999 | Saito et al. | |
| 6,367,833 B1 | 4/2002 | Horiuchi | |
| 6,580,188 B2 | 6/2003 | Katagiri et al. | |
| 7,954,593 B2 * | 6/2011 | Dornhege | B62D 5/0472 180/443 |
| 8,183,726 B2 | 5/2012 | Rittenhouse | |

(Continued)

FOREIGN PATENT DOCUMENTS

| | | | | |
|---|---|---|---|---|
| DE | 10046963 C1 * | 12/2001 | ............ | A61G 5/045 |
| WO | WO-2015154046 A1 * | 10/2015 | ............ | B60L 15/20 |

*Primary Examiner* — Cuong H Nguyen
(74) *Attorney, Agent, or Firm* — Quinn IP Law

(57) ABSTRACT

Presented herein are adaptive power assist systems for manually-powered vehicles, methods for operating/constructing such systems, and motorized operator-powered vehicles with adaptive power assist systems. A method for regulating a power assist system of a manually powered vehicle includes a vehicle controller determining path plan data that includes a predicted route plan to traverse from a current vehicle location to a desired vehicle destination. A resident wireless communications device receives, from a remote computing node, an assist level power trace for operating the vehicle's tractive motor on the predicted route plan. The vehicle controller receives health level data specific to the vehicle user, determines a power assist delta based on the health level data, and modifies the assist level power trace based on this power assist delta. The vehicle controller transmits command signals to the tractive motor to output a selectively variable torque according to the modified assist level power trace.

17 Claims, 3 Drawing Sheets

(56) References Cited

U.S. PATENT DOCUMENTS

| | | |
|---|---|---|
| 9,108,700 B2 | 8/2015 | Chen et al. |
| 9,636,993 B2* | 5/2017 | Biderman ............... B60L 15/20 |
| 9,771,124 B2 | 9/2017 | Seagraves et al. |
| 9,840,305 B1 | 12/2017 | Tsuchizawa et al. |
| 9,857,252 B2 | 1/2018 | Murugesan et al. |
| 2002/0036105 A1* | 3/2002 | Birmanns ............... A61G 5/045 |
| | | 180/65.1 |
| 2009/0078494 A1* | 3/2009 | Dornhege ............ B62D 5/0472 |
| | | 180/446 |
| 2011/0160945 A1 | 6/2011 | Gale |
| 2011/0215548 A1 | 9/2011 | Horwat, Jr. |
| 2012/0202649 A1 | 8/2012 | Huber |
| 2013/0179016 A1 | 7/2013 | Gale |
| 2016/0304157 A1 | 10/2016 | Craven et al. |

* cited by examiner

ADAPTIVE PEDAL ASSIST SYSTEMS AND CONTROL LOGIC FOR INTELLIGENT E-BIKES

INTRODUCTION

The present disclosure generally relates to motor-assisted, manually powered vehicles. More specifically, aspects of this disclosure relate to adaptive pedal assist systems and attendant control logic for motorized bicycles.

Many vehicles that have traditionally been powered by the vehicle's operator—be it hand-powered or leg-powered designs—may now be originally equipped with or retrofit to include a tractive motor for propelling the vehicle. The tractive motor, which may take on the form of an internal combustion engine (ICE) or an electric motor, generally propels the vehicle in either an unassisted or an assisted capacity, i.e., with or without manually generated motive power. For instance, a pedal electric cycle (colloquially referred to as an "e-bike") is equipped with an on-board electric motor for providing supplemental tractive torque that assists or "boosts" a rider's pedal-generated torque. The traction motor operates alone or in conjunction with a power transmission to rotate a driven member of the e-bike, such as a wheel, wheel hub, or pedal crank hub. Output torque from the motor may be selectively delivered to the driven member, e.g., when the rider negotiates a road surface with a pronounced gradient along a travel route. In this manner, the rider's perceived pedaling effort may be reduced when riding an e-bike relative to the perceived pedaling effort on a conventional cycle lacking an electrical assist (e-assist) function.

SUMMARY

Disclosed herein are adaptive power assist systems and attendant control logic for manually-powered vehicles, methods for operating and methods for constructing such adaptive power assist systems, and motorized operator-powered vehicles with adaptive power assist systems. By way of example, there are presented adaptive pedal assist protocols that operate on a distributed computing network and employ user health information and analogous trip information to modulate motor torque output of an intelligent e-bike. An adaptive pedal assist system may receive real-time and/or historical user health data from a wearable electronic device or other onboard sensing system to identify an e-assist delta increase or decrease for motor-assisted propulsion. In addition, or alternatively, an adaptive pedal assist system may call up or retrieve from resident memory or remote storage an electrical energy trace that corresponds to the rider's and/or other cyclist's similar routes to provide an intelligent adaptation of e-assist along a given route. Adaptive pedal assist may be provisioned using crowd-sourced data from participating cyclists as well as aggregated data from a cloud-based service in conjunction with real-time vehicle location tracking data (e.g., using a global positioning system (GPS) transceiver, cellular trilateration, active radio frequency identification (Active RFID), or other suitable technology).

Attendant benefits for at least some of the disclosed concepts may include the ability to aggregate and analyze user activity and health level data, and customize the level of power assist for a specific user based on their personal data. Other potential benefits of one or more disclosed systems, methods and devices may include the ability to intelligently adapt pedal assist to actively compensate for terrain changes and ambient conditions along a given route using energy usage data of other users for the same or similar routes. While some available e-bike designs may offer variable e-assist based on sensed gradient changes, vehicle speeds, and other vehicle dynamics data, these designs are not self-adaptive to individual users nor are they able to offer route-specific adaptations, e.g., to complement automated scenario-planning and route-generating capabilities. Aspects of the disclosed concepts help to ensure that an adaptive power assist system operates at optimal levels and, thus, minimizes battery/fuel usage while concomitantly extending vehicle operating range.

Aspects of this disclosure are directed to adaptive power assist techniques and computer-executable algorithms for operating motorized, user-powered vehicles. For instance, a method is presented for regulating assistive torque output of a manually powered vehicle's power assist system. The manually powered vehicle includes a rigid vehicle frame with one or more road wheels rotatably mounted to the frame. The power assist system includes an electric or combustion-based tractive motor that is mounted to the vehicle frame and operable to drive at least one of the road wheels. A resident vehicle controller with a wireless communications device is also mounted to the vehicle frame. This representative method includes, in any order and in any combination with any of the disclosed features and options: determining, via the resident vehicle controller, path plan data for the manually powered vehicle, the path plan data including a vehicle location, a vehicle destination, and a predicted route plan to traverse from the vehicle location to the vehicle destination; receiving, via the wireless communications device from a remote computing node, an assist level power trace for operating the tractive motor on the predicted route plan; receiving, via the resident vehicle controller, health level data specific to a current user of the manually powered vehicle; determining, via the resident vehicle controller based on the received health level data, a power assist delta for the user; modifying the assist level power trace based on the power assist delta via the resident vehicle controller; and transmitting, via the resident vehicle controller to the tractive motor, command signals to output a selectively variable torque according to the modified assist level power trace.

Other aspects of the present disclosure are directed to intelligent power assist systems for operator-powered vehicles. As used herein, the term "vehicle" and permutations thereof may include any relevant motorized vehicle platform that is predominantly human-powered, such as motorized cycles, scooters, skateboards, roller skates/blades, etc. In an example, a power assist system for a manually powered vehicle is presented that includes a tractive motor (ICE, electric, hybrid, etc.) that mounts on a frame of the vehicle and drivingly connects to at least one of the vehicle's road wheels. The tractive motor is electronically controlled to selectively apply a variable assist torque to the vehicle wheel or wheels. The power assist system also includes a resident vehicle controller, a resident memory device, and a resident wireless communications device, all of which are designed to mount onto the vehicle frame. The wireless communications device wirelessly communicates with a remote computing node, such as a cloud-based service or a database server computer.

Continuing with the above example, the resident vehicle controller, which is wired or wirelessly connected to the tractive motor and wireless communications device, is configured to execute various resident or remote memory stored instructions. For instance, the vehicle controller determines path plan data for the manually powered vehicle, including a current vehicle location (e.g., received via a GPS transceiver), a desired vehicle destination (e.g., received via a human-machine interface (HMI)), and a predicted route plan to traverse from the vehicle location to the vehicle destination (e.g., received from the remote computing node). The resident vehicle controller receives, via the wireless communications device from the remote computing node, an assist level power trace for operating the tractive motor to complete the predicted route plan. The resident vehicle controller also receives health level data specific to the current user of the manually powered vehicle. From this health level data and other optional data inputs, the controller determines a power assist delta for the user, and concomitantly increases or decreases portions of the assist level power trace based on the power assist delta. Command signals are then sent from the resident vehicle controller to the tractive motor to output a selectively variable torque according to the modified assist level power trace.

Additional aspects of this disclosure are directed to manually powered vehicles with adaptive power assist capabilities. In an example, a pedal electric cycle is disclosed that includes a rigid vehicle frame, multiple road wheels that are rotatably mounted to the vehicle frame, and a crankset that is also rotatably mounted to the vehicle frame. The crankset receives and transmits a manually-generated torque to one or more of the vehicle's road wheels. The pedal electric cycle is also equipped with a traction battery pack with sufficient charge capacity to power a tractive motor. The traction battery pack is mounted on the vehicle frame and has a measurable state of charge (SOC). In this regard, a controller-operated electric motor/generator unit (MGU) is electrically connected to the battery pack and operable to selectively impart electric-assist (e-assist) torque to at least one of the road wheels in response to motor control signals. A wireless communications device is mounted to the vehicle frame and operable to wirelessly communicate with a remote computing node over a distributed computing network.

The pedal electric cycle is also equipped with a resident vehicle controller that is mounted to the vehicle frame and operatively connected to the electric MGU and the wireless communications device. The resident vehicle controller is programmed to: determine path plan data for the pedal electric cycle, the path plan data including a vehicle location and a vehicle destination; transmit, via the wireless communications device to the remote computing node, the vehicle location, the vehicle destination, and a request for a predicted route plan to traverse from the vehicle location to the vehicle destination; receive, via the wireless communications device from the remote computing node, the predicted route plan and an assist level power trace for operating the electric MGU on the predicted route plan; receive health level data specific to a user of the pedal electric cycle; calculate a power assist delta as a function of the received health level data, the SOC of the battery pack, and a comfort factor specific to the user; modify the assist level power trace based on the power assist delta; and, transmit command signals to the electric MGU to output a selectively variable torque according to the modified assist level power trace.

For any of the disclosed systems, methods, and vehicles, determining the path plan data may include the resident vehicle controller transmitting a current location and trajectory of the manually powered vehicle to the remote computing node, and receiving from the remote computing node map match data that links the manually powered vehicle to a mapped geographic location. In this instance, the remote computing node may calculate, call-up, ascertain, or retrieve the predicted route plan based on the vehicle's current location, trajectory, and desired destination, and subsequently transmit the predicted route plan to the vehicle controller via the resident wireless communications device. Optionally, the resident vehicle controller may receive, from the user via an electronic user input device, a desired destination selection that is indicative of the vehicle destination. As another option, the resident vehicle controller may receive from an off-board location tracking system real-time location data that is indicative of the vehicle's current location.

For any of the disclosed systems, methods, and vehicles, the assist level power trace may be generated via the remote computing node based on respective assist level data that is received from one or more other power-assisted manually powered vehicles for a same or similar route to the predicted route plan. In addition, or alternatively, the assist level power trace may be generated via the remote computing node based on the user's historical assist level data for the same route or a similar route to the predicted route plan. As another option, the resident vehicle controller may transmit, via the wireless communications device to the remote computing node, a prompt to supply the assist level power trace. This prompt may include the vehicle's current location and desired destination. The remote computing node may respond to this prompt by determining and transmitting to the vehicle controller the predicted route plan.

For any of the disclosed systems, methods, and vehicles, the remote computing node may identify an aggregate database entry that corresponds to the predicted route plan, and calculate the assist level power trace based on a collection of data reports stored in association with the aggregate database entry. The remote computing node may contemporaneously determine if a total number of data reports in the collection of data reports is greater than a calibrated minimum data report baseline. If the total number of data reports is not greater than this calibrated minimum, the remote computing node may responsively mark the aggregate database entry as private. Conversely, if the total number of data reports is greater than the calibrated minimum baseline, the remote computing node may respond by marking the aggregate database entry as public.

For any of the disclosed systems, methods, and vehicles, the resident vehicle controller may be programmed to: receive from the vehicle user, via an electronic user input device, a desired maximum activity level; determine if a real-time activity level of the user during use of the manually powered vehicle is greater than the desired maximum activity level; and, in response to the real-time activity level of the user being greater than the desired maximum activity level, increasing the selectively variable torque that is output via the tractive motor. Conversely, if the real-time activity level of the user is less than the desired maximum activity level, the vehicle controller may responsively decrease the selectively variable torque being output via the tractive motor. The resident vehicle controller may also transmit, via the wireless communications device to the remote computing node, historical assist level data for the user for one or more prior routes. The remote computing node may aggregate, analyze, and store the user's historical assist level data. For e-bike configurations, the resident vehicle controller may determine a real-time magnitude of pedal-generated torque being transmitted to the vehicle's road wheels, and modulate the selectively variable torque being output via the electric MGU based on the real-time magnitude of the pedal-generated torque.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
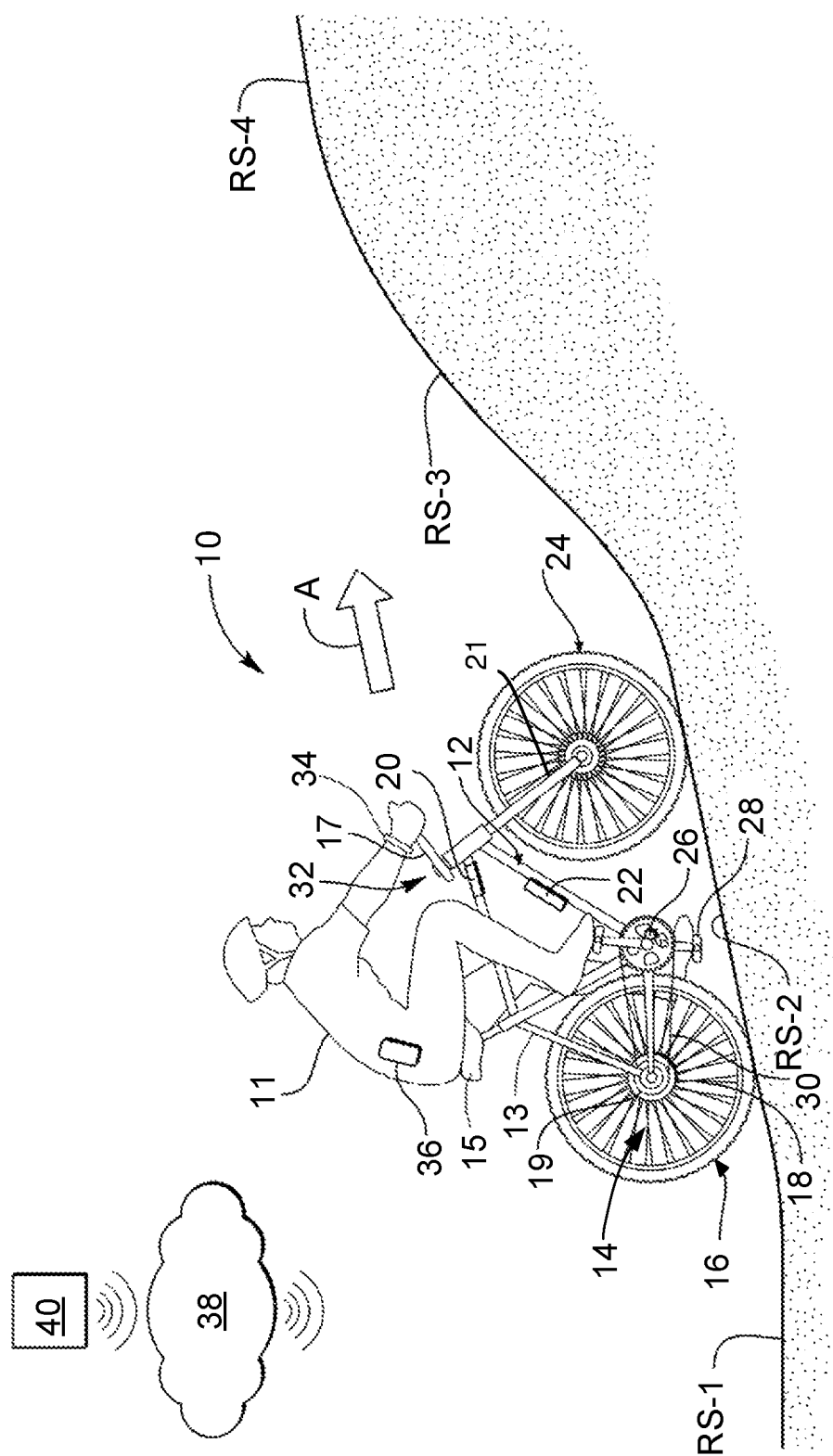
FIG. 1 is a partially schematic illustration of a representative motor-assisted, manually powered vehicle having adaptive power assist capabilities in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including" and "comprising" and "having" shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motorized vehicle, such as a forward driving direction of a motor-assisted bicycle when the vehicle is operatively oriented on a normal driving surface, for example.

Referring now to the drawings, wherein like reference numbers refer to like features throughout the several views, there is shown in FIG. 1 a representative user-powered, motor-assisted vehicle, which is designated generally at 10 and portrayed herein for purposes of discussion as a pedal electric cycle ("e-bike"). Distributed throughout the vehicle 10, e.g., packaged at different locations on a vehicle frame 12, is an adaptive pedal assist system 14 that provides supplemental torque for propelling the vehicle 10. The motor-assisted, user-powered vehicle 10 of FIG. 1—also referred to herein as "manually powered vehicle" or "vehicle" for short—is merely an exemplary application with which aspects and features of this disclosure may be practiced. In the same vein, implementation of the present concepts for an electric-motor-based pedal assist system 14 should also be appreciated as an exemplary application of the concepts and features disclosed herein. As such, it will be understood that aspects and features of this disclosure may be applied to other adaptive power assist architectures, and implemented for any logically relevant type of manually powered vehicle. Lastly, the drawings presented herein are not necessarily to scale and are provided purely for instructional purposes. Thus, the specific and relative dimensions shown in the drawings are not to be construed as limiting.

Adaptive pedal assist system 14 of FIG. 1 is generally composed of a tractive motor 18 that communicates with and is governed by a resident vehicle controller 20, both of which are securely mounted to the rigid vehicle frame 12. According to the illustrated example, the tractive motor 18 is a rear-mounted electric motor/generator unit (MGU) that is powered by a traction battery pack 22 for selectively driving a rear wheel unit 16 (e.g., tire, rim, spokes, hub, and axle). The tractive motor 18 may be mounted by a suitable mounting bracket or central hub 19 to a rear fork 13 of the vehicle frame 12. While shown as a direct drive propulsion unit, the tractive motor 18 may be coupled to the rear wheel unit 16 through a suitable power transmission, such as a belt-drive or a chain-drive transmission, for imparting motive power to the vehicle 10. Alternative power assist architectures may drivingly connect the tractive motor 18 to a steerable front wheel unit 24 or a centrally located crankset 26, or any combination of the wheel units 16, 24 and crankset 26, to provide driving power for propulsion of the vehicle 10. It is further envisioned that the vehicle 10 employ other prime movers for supplemental propulsion, including an internal combustion engine (ICE) assembly or a hybrid powertrain that employs both an electric motor and a combustion engine.

With continuing reference to FIG. 1, the tractive motor 18 is electrically connected to and energized by the traction battery pack 22 to propel the vehicle 10 in either an unassisted (self-propulsion) mode or an assisted (supplemental-propulsion) mode. Resident vehicle controller 20 is programmed to receive and process various user-input signals, sensor signals, and wireless data exchanges, and respond to these inputs by modulating the torque output of the tractive motor 18 via one or more motor control signals. During the assisted operating mode, the tractive motor 18 outputs an "e-assist" torque at a level sufficient to augment or "boost" user-generated torque while still satisfying, to the extent possible, one or more desired e-assist objectives of the user 12. When functioning in a self-propulsion or unassisted operating mode, the tractive motor 18 outputs a motive torque that is sufficient to temporarily propel the vehicle 10 without the rider pedaling. In this manner, the resident vehicle controller 20 may automatically allocate electrical energy from the traction battery pack 22 to the tractive motor 18 in real-time, and thus reserves and optimizes e-assist functions in real-time while the vehicle 10 negotiates a travel route.

Pedal electric cycle 10 of FIG. 1 may take on any suitable bike configuration, including unicycle, bicycle, tricycle, quadracycle, etc., and may incorporate a male, female, or unisex frame construction. The representative vehicle frame 12 is shown equipped with an adjustable seat assembly 15 for supporting thereon a rider (or "user") 11, and a handlebar set 17 or other steering mechanism that allows the rider 11 to manually control the heading and directional changes of the vehicle 10. Wheel units 16 and 24 (also referred to herein as "road wheels" or merely "wheels" for simplicity) are rotatably mounted to the vehicle frame 12 via respective rear and front forks 13 and 21. These wheel units 16 and 24 are in rolling frictional contact with a surface, which is represented in FIG. 1 by four adjoining, distinctly angled road sections RS1-RS4. Using cyclical rotational motion of his/her feet, the rider 11 applies pedaling rotation to pedals 28 to generate motive forces to propel the vehicle 10. These forces are imparted to the components of an interconnected crankset 26, i.e., opposing crank arms rigidly secured to one or more sprockets. When the rider 11 rotates the crankset 26, the resultant rotation imparts manual pedaling torque to the rear road wheel 16. Torque transfer occurs via a drive mechanism 30, such as a closed loop of bike chain. The drive mechanism 30 is mechanically coupled to the central hub 19, e.g., via a complementary driven sprocket (not shown), in a rear wheel drive bicycle configuration. Thus, manual pedaling forces imparted by the rider 11 to the pedals 28 ultimately rotates the rear road wheel 16 and thereby propels the vehicle 10 over the road surface 14 in the direction of arrow A.

For at least some applications, the vehicle 10 may be optionally equipped with regenerative charging capabilities that enable the traction battery pack 22 to be recharged during operation of the vehicle 10. When the vehicle 10 is on a bikeway decline, for example, the wheels 16 and 24 may normally freewheel while gravity provisionally provides the motive force that propels the vehicle 10. Alternatively, the resident vehicle controller 20 may switch the tractive motor 18 from a motoring mode to a generator mode thereby allowing the motor 18 to produce electrical energy, e.g., by inducing electromagnetic induction through the motor's rotor and stator. In such a regenerative charging embodiment of the vehicle 10, the tractive motor 18 may be equipped with any requisite power conditioning equipment, e.g., a power inverter, DC-DC converter, link capacitors, and/or other power filtering components, etc.

E-assist capabilities may be selectively provided by the tractive motor 18 in response to motor control signals from the resident vehicle controller 20. Real-time interface of the rider 11 with the resident vehicle controller 20 may be facilitated via a graphical user interface 32 that is mounted onto the handlebar set 17 of the vehicle 10. A fitness tracker device, which is portrayed in FIG. 1 as a wearable electronic device 34, is configured to monitor the heart rate, caloric expenditure, perspiration, pedal rate, or any other such health-related and activity-related parameters of the rider 11. As another option, the rider 11 may use a cellular-enabled smartphone device 36 to provide additional inputs to the resident vehicle controller 20, such as real-time vehicle location tracking, user preferences and milestones, historical assist level data, etc. Each of the resident vehicle controller 20, wearable electronic device 34, and/or smartphone device 36 may communicate wirelessly with one another and with one or more remote computing nodes, depicted schematically as a cloud-based service 38 and a backend database server computer 40. Communication capabilities with remote, off-board networked devices may be provided via a cellular chipset/component, a wireless modem, a navigation and location chipset/component (e.g., GPS transceiver), a short-range wireless communication device 48 (e.g., a Bluetooth® unit or near field communications (NFC) transceiver), a dual antenna, or other suitable means of wireless communication.

As indicated above, resident vehicle controller 20 is constructed and programmed to govern, among other things, operation of the tractive motor 18. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The controller may be designed with a set of control routines executed to provide desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event during operation of the vehicle 10.

Figure 2:
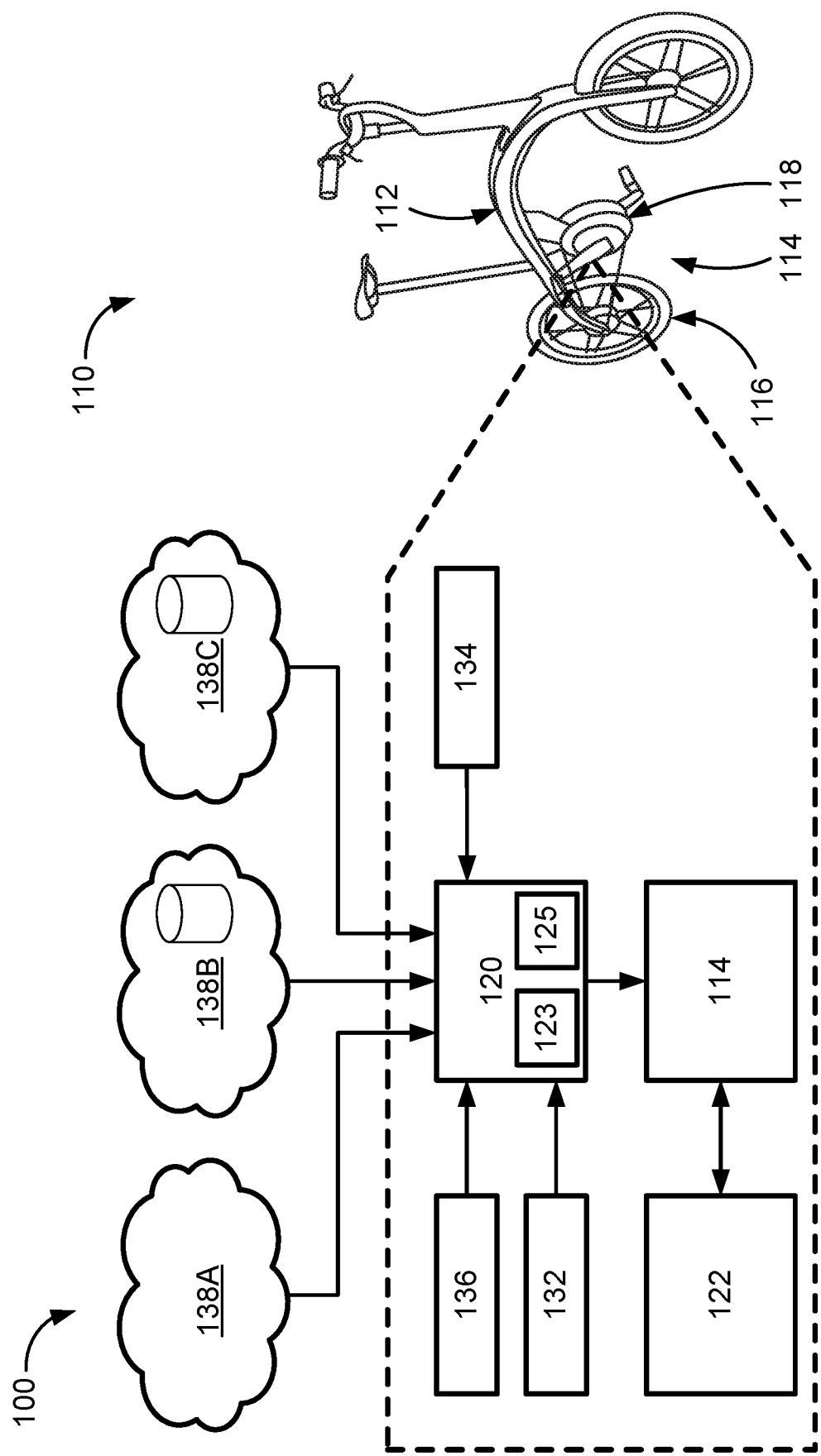
FIG. 2 is a diagrammatic illustration of a representative adaptive pedal assist system architecture for an intelligent pedal electric cycle in accordance with aspects of the present disclosure.

FIG. 2 is a diagram of a distributed computing network 100 for providing adaptive pedal assist capabilities to an intelligent pedal electric cycle 110. While differing in appearance, it is envisioned that any of the features and options and alternatives disclosed above with reference to the motorized operator-powered vehicle 10 of FIG. 1 can be incorporated, singly or in any combination, into the pedal electric cycle 110 of FIG. 2, and vice versa. Similar to the manually powered vehicle 10 of FIG. 1, for example, the pedal electric cycle 110 of FIG. 2 has a rigid vehicle frame 112, an adaptive pedal assist system 114 with a tractive motor 118 and a resident vehicle controller 120, and a rear wheel unit 116 that receives supplemental torque from the tractive motor 118 during operation of the adaptive pedal assist system 114. The resident vehicle controller 120 communicates with a graphical user interface (GUI) 132 (e.g., an e-bike telematics module), a wearable electronic device 134, and a smartphone 136 (BLUETOOTH Low Energy (BLE) connected smartphone), and transmits command signals to the tractive motor 118, which is electrically connected to a traction battery pack 122. The resident vehicle controller 120 may include a main or auxiliary memory device 123, which stores processor-executable instructions for carrying out an adaptive pedal assist protocol (e.g., method 200 of FIG. 3), and a wireless communications device 125, which enables the controller 120 to broker wireless data exchanges.

During operation of the pedal electric cycle 110, the resident vehicle controller 120 wireless communicates with one or more remote computing nodes, such as a predictive navigation cloud service 138A, an energy usage database cloud service 138B, and a map database cloud service 138C. It is envisioned that the three nodes 138A-138B may be combined into a single cloud-based service or a single backend server system. As yet another option, many of the functions performed by the three nodes 138A-138B may be carried out locally via the resident vehicle controller 120; likewise, many of the operations performed by the vehicle controller 120 may be off-boarded to a remote computing node, e.g., to minimize computational load, energy consumption, and local memory requirements. The predictive navigation cloud service 138A may store trip origin data, trip destination data, road segment IDs, and a total number of instances of each. Optionally, the service 138A may also maintain temporal information, such as day of week data, time of day data, etc., that may be used to infer a likely destination or a next road link. Energy usage database cloud service 138B may store crowd-sourced pedal assist level data that may be processed to generate electrical energy usage traces (e.g., in kilowatt hours) each stored per road segment. The map database cloud service 138C may maintain geographic, topographical, terrain and geometry data for various paths. In addition, the service 138C may be provided with a routing engine that supports route planning and predictive navigation.

In accord with aspects of the disclosed concepts, the adaptive pedal assist system 114 of the pedal electric cycle 110 of FIG. 2 may use historical pedal assist data collected for the same route or similar routes from the current user and/or from other contributing users (e.g., in a crowd sourcing context) to automatically identify and set an optimal assist level (e.g., in an auto-assist mode). E-assist levels throughout the predicted route plan may be governed based on this collected data. Nominal assist levels can be adjusted up or down to tailor e-assist to the particular needs and expectations of a specific user; assist levels can also be manually selected by a user or modified in real-time by the resident controller. In so doing, the adaptive pedal assist system 114 helps to maintain a desired comfort level, e.g., before a maximum heart rate threshold is achieved, helps to maintain a desired comfort level, e.g., without the need for heart rate data or continual user input, and helps to enable setting an optimal assist level throughout a designated trip, e.g., without requiring continual feedback and/or adjustments by the rider.

With continuing reference to FIG. 2, the adaptive pedal assist system 114 retrieves pedal assist level information produced by other contributing vehicles to determine and automatically set an optimal pedal assist level for an individual rider. By way of non-limiting example, the pedal electric cycle 110 may travel along a given path, e.g., as determined by predictive navigation cloud service 138A, and encounter a hill or other arduous terrain, e.g., as identified by map database cloud service 138C. An optimal assist level for a user may be determined by energy usage database cloud service 138B, and automatically set by the resident vehicle controller 120 based on how other riders set the assist level to maintain overall comfort for the same hill/terrain or similarly strenuous hills/terrains. This approach may complement an optional "No Sweat" mode (e.g., assist level set according to user's current heart rate) and an optional "Energy Conservation Mode" setting (e.g., energy management protocol that balances assist level with battery capacity). Assist level information from the pedal electric cycle 110 and other crowd-sourced e-bikes may be sent to and aggregated by the energy usage database cloud service 138B. Pedal electric cycle 110 may be map-matched onto a road, route or terrain by the map database cloud service 138C. If there is sufficient assist level data available for that geographic location, an electrical energy trace for e-assist may be determined from the data, and the pedal assist may be automatically set to coincide with the electrical energy trace.

As will be described in further detail below, the adaptive pedal assist system 114 may characterize a power assist delta based, at least in part, on a current user's historical activity level (e.g., user's average number of steps per day vs. crowd-sourced average steps per day; user's average intensity of activities per day vs. crowd-sourced average intensity per day; etc.) Using this power assist delta, the resident vehicle controller 120 may perform an assist level adjustment. Adaptive pedal assist system 114 may also characterize a comfort delta by predicting a user desired comfort level, e.g., as a comfort factor (Fc) which is a function ƒ(activity duration, activity intensity, . . . ). The system 114 may monitor various user health parameters, such as heart rate, oxygen consumption, perspiration, etc., and determine how it varies with activity, e.g., as a delta heart rate (dHr) which is a function ƒ(current heart rate, weather, activity duration and intensity). Adaptive pedal assist system 114 may continuously monitor a battery state of charge (SOC) or other parameter indicative of battery charge level to help predict future electrical storage needs. A pedal assist delta may be determined as delta pedal assist (dPa) which is a function ƒ(comfort factor (Fc), delta heart rate (dHr), battery level, etc.).

To support user expectations and improve user experience, the pedal electric cycle's 110 current position and travel path are used to generate a predicated route plan. From the route plan, the adaptive pedal assist system 114 is able to predict heart rate increases/decreases and user comfort levels at current pedal assist levels for the duration of the route. If predicted heart rate is expected to exceed a given threshold/target, the adaptive pedal assist system 114 may provide a higher level of pedal assist. Conversely, if predicted heart rate is expected to be below the threshold/target, the adaptive pedal assist system 114 may opt to provide a lower level of pedal assist, e.g., to help conserve energy and extend operating range. However, if the system 114 determines that there will be relatively no change in predicted heart rate, it will continue with a current or default level of pedal assist. Other information that may be used to adjust pedal assist levels may include traffic signal information (e.g., phase, time remaining, distance to stop bar, etc.), stop sign information, railroad crossing data, weather and ambient temperature data, season information, bike information (e.g., make, model, options, etc.).

Figure 3:
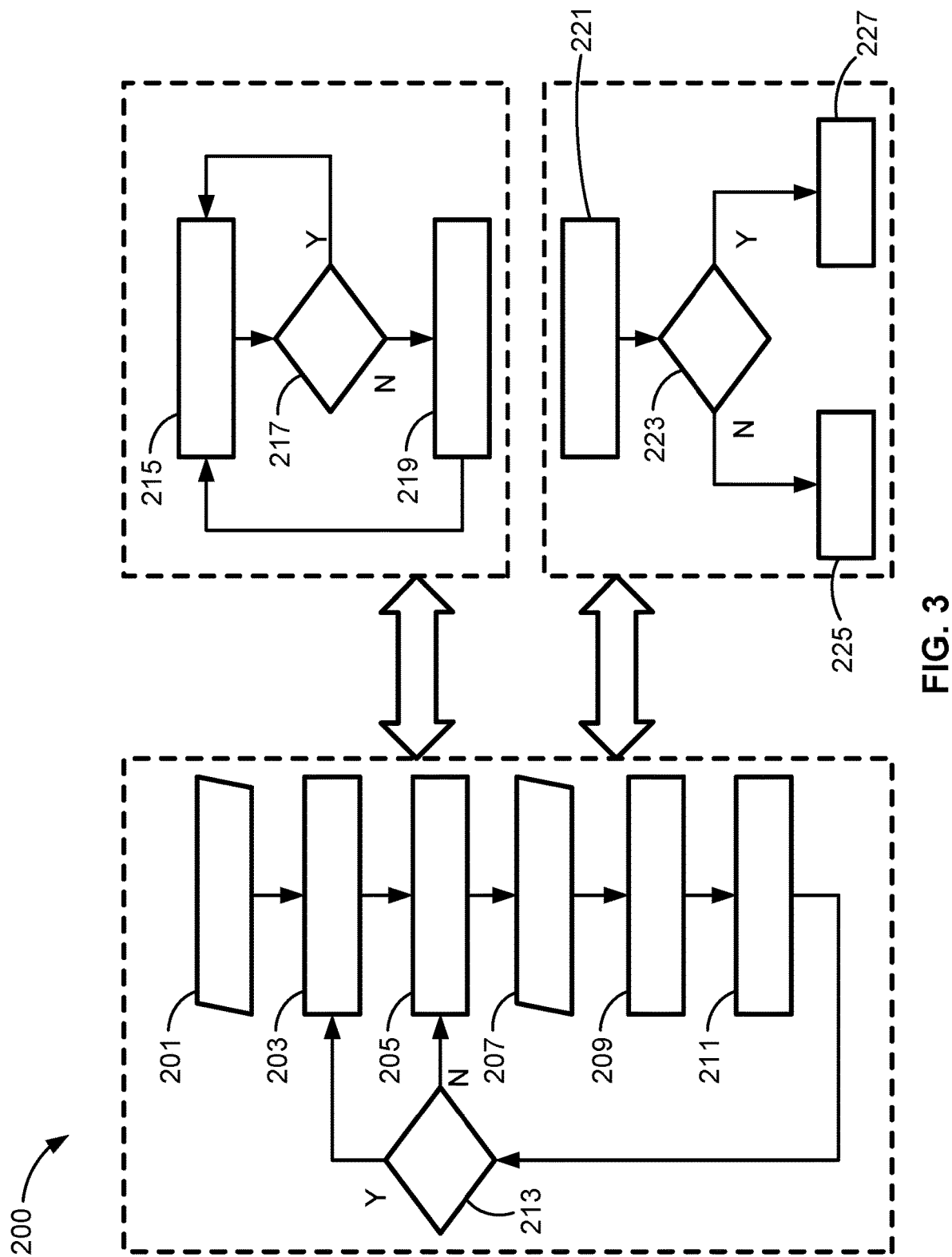
FIG. 3 is a flowchart for an automated power assist protocol for a manually powered vehicle that may correspond to instructions executed by onboard or remote control-logic circuitry, programmable electronic control unit, or other computer-based device or network of devices in accord with aspects of the disclosed concepts.

With reference now to the flow chart of FIG. 3, an improved method or control strategy for provisioning adaptive power assist capabilities to a manually powered vehicle, such as vehicle 10 of FIG. 1 or pedal electric cycle 110 of FIG. 2, is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at input/output block 201 with processor-executable instructions for a programmable controller or control module to receive user-specific health level data from a remote source. In the representative architecture of FIG. 1, for example, the manually powered vehicle 10 may wirelessly communicate with: (1) the wearable electronic device 34 to receive real-time heart rate, blood pressure, perspiration, body temperature, intensity, and/or duration information; (2) the smartphone device 36 to receive recent activity level data, such as average number of steps, average intensity of activities, and/or average duration of activities over a given timeframe (e.g., the last seven days); and (3) the backend database server computer 40 to retrieve the user's historical health information, such as known medical history for a user's respiratory system, circulatory system, musculature, metabolic disorders, etc. It is envisioned that the vehicle 10 may aggregate other types of information from any number of sources, whether resident to or remote from the vehicle 10. For instance, the resident vehicle controller 20 may continuously, systematically, or intermittently monitor rider-generated torque received via crankset 26.

Using the data that is retrieved, accessed or collected (collectively "received") at input/output block 201, the method 200 will calculate, call-up, estimate, or retrieve (collectively "determine") a power assist delta for the particular user associated with the received data, at process block 203. By way of example, and not limitation, the resident vehicle controller 20 may aggregate the received health level data, process the aggregated data to calculate a health score (e.g., 0-100), and use the calculated health score to assign the present user to a specific health level category (e.g., 0-15=sedentary; 16-35=generally inactive; 36-65=average; 66-85=generally active, 86-100=dynamic). A respective power assist delta may be calibrated to each category (e.g., sedentary $\Delta_{SD}$=+20%; generally inactive $\Delta_{GI}$=+10%; average $\Delta_{AG}$=0%; generally active $\Delta_{GF}$=−10%; and dynamic $\Delta_{DY}$=−20%). In this instance, the resident vehicle controller 20 retrieves the power assist delta that corresponds to the health level category to which the present user is assigned. The power assist delta may be an increasing positive multiplier or percentage increase for amplifying e-assist, or a decreasing multiplier or percentage decrease for reducing e-assist. It is envisioned that alternative techniques may be employed for determining the power assist delta at process block 203. Likewise, a power assist delta may comprise multiple deltas, each of which corresponds to a specific occurrence (e.g., User1_PowerΔ=PowerΔ1(road, flat), PowerΔ2(road, minor incline), PowerΔ3(road, mild incline), PowerΔ4(road, major incline), PowerΔ5(road, major decline), PowerΔ6(road, minor decline), PowerΔ7(off-road, basic), PowerΔ8(off-road, difficult), PowerΔ9(off-road, difficult), PowerΔ10(urban)).

With continuing reference to FIG. 3, the method 200 continues to process block 205 with processor-executable instructions for determining path plan data for completing a given route by the manually powered vehicle. The path plan data may include, for example, a current vehicle location, a desired vehicle destination, and a predicted route plan to traverse from the vehicle location to the vehicle destination. According to the example presented in FIG. 2, the user (e.g., rider 11 of FIG. 1) may select a desired vehicle destination using GUI 132, which concomitantly transmits a corresponding signal indicative thereof to the resident vehicle controller 120 of e-bike 110. Contemporaneous with the user's selection, the resident vehicle controller 120 may prompt the smartphone 136 to produce real-time trajectory data and location data that is indicative of the vehicle's current location. Resident vehicle controller 120 then transmits, via wireless communications device 125, a prompt with location, trajectory and destination data to the map database cloud service 138C. Upon receiving the prompt data packet, map database cloud service 138C will generate map match data that links the e-bike 120 to a mapped geographic location. The predictive navigation cloud service 138A computing node may concurrently estimate a predicted route plan (e.g., a proposed course) for reaching the desired vehicle destination based on the current location and trajectory of the e-bike 110. Once the predicted route plan is determined, map database cloud service 138C and predictive navigation cloud service 138A transmit the map match data and predicted route plan to the resident vehicle controller 120 via wireless communications device 125.

Method 200 continues to input/output block 207 with instructions to retrieve energy usage details for the various adjoining surface segments that define the predicted route plan. For instance, the adaptive pedal assist system 114 of FIG. 2, e.g., while employing active or predictive navigation in cooperation with the predictive navigation cloud service 138A, receives an assist level power trace from the energy usage database cloud service 138B for operating the tractive motor 118 over the course of the predicted route plan. In one example, the wireless communications device 125 transmits a prompt from the resident vehicle controller 120 to the cloud service 138B to supply an assist level power trace that corresponds to the given route. This prompt may include any of the path plan data discussed above. Energy usage database cloud service 138B may respond to this prompt by producing or retrieving an assist level power trace based, at least in part, on assist level data received from other power-assisted manually powered vehicles and/or historical assist level data of the user for the same route or similar routes to the predicted route. For at least some implementations, this operation may require the energy usage database cloud service 138B identify an aggregate database entry that corresponds to the predicted route plan, and calculate an assist level power trace using a collection of data reports stored in association with this aggregate database entry. Alternatively, the database cloud service 138B may identify the appropriate aggregate database entry that corresponds to the predicted route plan, collect and condense the associated collection of data reports, and transmit this data to the resident vehicle controller 120, which may be ultimately responsible for determining the assist level power trace.

At process block 209, the method 200 computes an adjusted or modified assist level that is offset by the power assist delta identified at process block 203. As indicated above, a single delta may be applied to an assist level power trace to collectively increase/decrease the entire assist level power trace. Alternatively, the computed offset for a given user may contain a series of power assist deltas—be it increasing modifiers, decreasing modifiers, or a combination of both—that functions to adjust individual segments of the trace by a respective delta. Once computed, the resident vehicle controller 120 will transmit to the tractive motor 118 a corresponding command signal or set of signals to output a selectively variable torque according to the modified assist level power trace, at process block 211.

At decision block 213, the method 200 will assess whether or not a predetermined activity level milestone has been achieved. As a non-limiting example, the rider 11 of FIG. 1 may enter a desired maximum activity level via any suitable user input device, including graphical user interface 32, wearable electronic device 34, and/or smartphone device 36. This desired maximum activity level may then be translated into a threshold user-generated torque level. Resident vehicle controller 20, while transmitting command signals to operate the tractive motor 18, may determine, in real-time, if the current activity level of the user (e.g., rider-generated torque received via crankset 26) is greater than the desired maximum activity level (e.g., the threshold user-generated torque level. If the activity level milestone has been met or exceeded (e.g., the real-time activity level of the user is greater than the desired maximum activity level) (Block 213=YES), the method 200 may responsively return to process block 203 to determine a new power assist delta that would increase the selectively variable torque that is output by the tractive motor and, thus, reduce any requisite rider-generated torque. Conversely, if the activity level milestone has not been met (e.g., the real-time activity level of the user is less than the desired maximum activity level) (Block 213=NO), the method 200 may responsively return to process block 205 and maintain (or decrease) e-assist levels.

With continuing reference to FIG. 3, process block 215 includes retrieving assist level data for a given user of the e-bike for a specific geographic location/route. For instance, the resident vehicle controller 120 may monitor and trace the activity of the tractive motor 118 for the duration of a mapped route. The retrieved assist level data may include a power output setting value (e.g., 1-10) for the tractive motor 118, or may include a detailed power (voltage or current) trace for the tractive motor 118. Prior to, contemporaneous with, or after retrieving this data, the method 200 may determine, at decision block 217, if there is a sufficient amount of data already published to the remote computing node. Resident vehicle controller 120 may "ping" the energy usage database cloud service 138B to review its files and determine if an aggregate database entry already exists for the given route and, if so, whether or not there are sufficient data reports for that entry. If there is an insufficient amount of data for a particular location/route (Block 217=NO), the retrieved assist level data may be transmitted from the e-bike 110 to the energy usage database cloud service 138B of FIG. 2 for collection, processing, and storage, as indicated at process block 219. The database 138B would examine the transmitted data and attach it to the appropriate road segment entry. If a sufficient amount of data for a particular location/route is already present (Block 217=YES), the method 200 may responsively return to process block 215 or may discontinue the loop through blocks 215, 217 and 219.

As a follow-on to the above discussion of blocks 215, 217 and 219, process block 221 of FIG. 3 includes instructions for receiving assist level data and location data, e.g., via energy usage database cloud service 138B from resident vehicle controller 120, and either creating a new aggregate database entry or supplementing an existing aggregate database entry with the received data. At decision block 223, the energy usage database cloud service 138B may determine if a total number of data reports in the collection of data reports associated with this new/existing aggregate database entry is greater than a calibrated minimum number of data reports. If the total number of data reports is in fact not greater than the calibrated minimum (Block 223=NO), energy usage database cloud service 138B may responsively mark that aggregate database entry as private at process block 225 and, thus, make the data unavailable for broadcast for public use. Conversely, in response to the total number of data reports being greater than the calibrated minimum number of data reports (Block 223=YES), energy usage database cloud service 138B may mark the aggregate database entry as public at process block 227 and, thus, make the data available for broadcast.

Aspects of this disclosure may be implemented, in some embodiments, through a computer-executable program of instructions, such as program modules, generally referred to as software applications or application programs executed by an onboard vehicle computer or a distributed network of resident and remote computing devices. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for regulating a power assist system of a manually powered vehicle, the manually powered vehicle including a frame with one or more wheels rotatably mounted to the frame, the power assist system including a tractive motor mounted to the frame and operable to drive at least one of the wheels, and a resident vehicle controller with a wireless communications device mounted to the frame, the method comprising:
   determining, via the resident vehicle controller, path plan data for the manually powered vehicle, the path plan data including a vehicle location, a vehicle destination, and a predicted route plan to traverse from the vehicle location to the vehicle destination;
   receiving, via the wireless communications device from a remote computing node, an assist level power trace for operating the tractive motor on the predicted route plan;
   receiving, via the resident vehicle controller, health level data specific to a user of the manually powered vehicle;
   determining, via the resident vehicle controller based on the received health level data, a power assist delta for the user;
   modifying the assist level power trace based on the power assist delta via the resident vehicle controller; and
   transmitting, via the resident vehicle controller to the tractive motor, command signals to output a selectively variable torque according to the modified assist level power trace.

2. The method of claim 1, wherein determining the path plan data includes:
   transmitting, via the wireless communications device to the remote computing node, the current location and a trajectory of the manually powered vehicle; and
   receiving, via the wireless communications device from the remote computing node, map match data linking the manually powered vehicle to a mapped geographic location.

3. The method of claim 2, wherein the remote computing node determines the predicted route plan based on the current location, the trajectory, and the vehicle destination, and transmits the predicted route plan to the wireless communications device.

4. The method of claim 1, further comprising receiving, via the resident vehicle controller from a user input device, a desired destination selection of the user indicative of the vehicle destination.

5. The method of claim 1, further comprising receiving, via the resident vehicle controller from an off-board location tracking system, real-time location data indicative of the vehicle location.

6. The method of claim 1, wherein the assist level power trace is generated via the remote computing node based on respective assist level data received from one or more other power-assisted manually powered vehicles for a same or similar route to the predicted route plan.

7. The method of claim 1, wherein the assist level power trace is generated via the remote computing node based on historical assist level data of the user for a same or similar route to the predicted route plan.

8. The method of claim 1, further comprising:
   transmitting, via the wireless communications device to the remote computing node, a prompt to supply the assist level power trace, the prompt including the vehicle location and vehicle destination; and
   determining, via the remote computing node, the predicted route plan.

9. The method of claim 8, further comprising:
   identifying, via the remote computing node, an aggregate database entry corresponding to the determined predicted route plan; and
   calculating the assist level power trace via the remote computing node based on a collection of data reports stored with the aggregate database entry.

10. The method of claim 9, further comprising:
    determining, via the remote computing node, if a total number of data reports in the collection of data reports is greater than a calibrated minimum data report baseline; and
    in response to the total number of data reports not being greater than the calibrated minimum data report baseline, marking the aggregate database entry as private; and
    in response to the total number of data reports being greater than the calibrated minimum data report baseline, marking the aggregate database entry as public.

11. The method of claim 1, further comprising:
    receiving, via the resident vehicle controller from the user via a user input device, a desired maximum activity level;
    determining, via the resident vehicle controller after transmitting the command signals to the tractive motor, if a real-time activity level of the user is greater than the desired maximum activity level; and
    in response to the real-time activity level of the user being greater than the desired maximum activity level, increasing the selectively variable torque output via the tractive motor.

12. The method of claim 1, further comprising transmitting, via the wireless communications device to the remote computing node, historical assist level data for the user for one or more prior routes.

13. The method of claim 1, wherein the manually powered vehicle is a pedal electric cycle with a crankset configured to impart a pedal-generated torque to at least one of the wheels, and the tractive motor is an electric motor/generator unit (MGU), the method further comprising:
    determining a real-time magnitude of the pedal-generated torque being transmitted to the at least one of the wheels; and
    modulating the selectively variable torque being output via the electric MGU based on the real-time magnitude of the pedal-generated torque.

14. The method of claim 1, wherein receiving the health level data includes the resident vehicle controller aggregating and analyzing sensor data received via the wireless communications device from a wearable electronic device worn by the user and/or a smartphone carried by the user.

15. The method of claim 1, wherein the health level data includes current activity level data, historical health data, and/or current health data specific to the user of the vehicle.

16. A power assist system for a manually powered vehicle, the manually powered vehicle including a vehicle frame with one or more wheels mounted to the vehicle frame and configured to be driven by a manually generated force, the power assist system comprising:

a tractive motor configured to mount on the vehicle frame and drivingly connect to at least one of the one or more wheels, the tractive motor being configured to selectively apply an assist torque to the at least one of the one or more wheels;

a wireless communications device mounted to the vehicle frame and configured to wirelessly communicate with a remote computing node; and a resident vehicle controller mounted to the vehicle frame and operatively connected to the tractive motor and the wireless communications device, the resident vehicle controller being configured to:

determine path plan data for the manually powered vehicle, the path plan data including a vehicle location, a vehicle destination, and a predicted route plan to traverse from the vehicle location to the vehicle destination;

receive, via the wireless communications device from the remote computing node, an assist level power trace for operating the tractive motor on the predicted route plan;

receive health level data specific to a user of the manually powered vehicle;

determine a power assist delta for the user based on the received health level data;

modify the assist level power trace based on the power assist delta; and transmit command signals to the tractive motor to output a selectively variable torque according to the modified assist level power trace.

17. A pedal electric cycle comprising:

a vehicle frame;

a plurality of road wheel rotatably mounted to the vehicle frame;

a crankset rotatably mounted to the vehicle frame and configured to impart a manually-generated torque to at least one of the road wheels;

a traction battery pack connected to the vehicle frame and having a state of charge (SOC);

an electric motor/generator unit (MGU) electrically connected to the traction battery pack and configured, in response to motor control signals, to selectively impart electric-assist (e-assist) torque to at least one of the road wheels;

a wireless communications device mounted to the vehicle frame; and a resident vehicle controller mounted to the vehicle frame and operatively connected to the electric MGU and the wireless communications device, the resident vehicle controller being programmed to:

determine path plan data for the pedal electric cycle, the path plan data including a vehicle location and a vehicle destination;

transmit, via the wireless communications device to a remote computing node, the vehicle location, the vehicle destination, and a request for a predicted route plan to traverse from the vehicle location to the vehicle destination;

receive, via the wireless communications device from the remote computing node, the predicted route plan and an assist level power trace for operating the electric MGU on the predicted route plan;

receive health level data specific to a user of the pedal electric cycle;

calculate a power assist delta as a function of the received health level data, the SOC of the traction battery pack, and a comfort factor specific to the user;

modify the assist level power trace based on the power assist delta; and transmit command signals to the electric MGU to output a selectively variable torque according to the modified assist level power trace.

\* \* \* \* \*